(12) United States Patent
Goodarzi et al.

(10) Patent No.: US 12,365,330 B2
(45) Date of Patent: Jul. 22, 2025

(54) SYSTEM AND METHOD FOR TRAILER INSTABILITY ADVANCED WARNING BASED ON HITCH LOAD MEASUREMENT

(71) Applicant: GM GLOBAL TECHNOLOGY OPERATIONS LLC, Detroit, MI (US)

(72) Inventors: Avesta Goodarzi, Whitby (CA); Utkarsh Saini, Pickering (CA); Ralph D Schlottke, Whiteby (CA)

(73) Assignee: GM GLOBAL TECNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 18/352,619

(22) Filed: Jul. 14, 2023

(65) Prior Publication Data

US 2025/0018926 A1   Jan. 16, 2025

(51) Int. Cl.
*B60W 30/02* (2012.01)
*B60D 1/24* (2006.01)
*B60D 1/30* (2006.01)

(52) U.S. Cl.
CPC ........... *B60W 30/02* (2013.01); *B60D 1/248* (2013.01); *B60D 1/305* (2013.01); *B60W 2300/14* (2013.01)

(58) Field of Classification Search
CPC ........... B60W 30/02; B60W 2300/14; B60W 2520/10; B60W 2530/203; B60W 50/14; B60D 1/248; B60D 1/305; B60D 1/30; B60D 1/62
See application file for complete search history.

(56) References Cited

U.S. PATENT DOCUMENTS

| | | | | |
|---|---|---|---|---|
| 6,838,979 | B2 * | 1/2005 | Deng | B62D 15/028 |
| | | | | 701/72 |
| 2004/0021291 | A1 * | 2/2004 | Haug | B60T 8/1708 |
| | | | | 280/455.1 |
| 2010/0241319 | A1 * | 9/2010 | Choby | B60T 7/20 |
| | | | | 701/70 |
| 2016/0236526 | A1 * | 8/2016 | Shepard | B60D 1/36 |
| 2017/0008559 | A1 * | 1/2017 | Shepard | B62D 1/046 |
| 2017/0043807 | A1 * | 2/2017 | Shepard | B60D 1/62 |

(Continued)

FOREIGN PATENT DOCUMENTS

| | | |
|---|---|---|
| DE | 102006030001 A1 | 1/2008 |
| DE | 102018117353 A1 | 1/2020 |

(Continued)

*Primary Examiner* — Joseph J Dallo
(74) *Attorney, Agent, or Firm* — Lorenz & Kopf LLP (57) ABSTRACT

Methods and systems are provided for controlling towing of a trailer by a vehicle. Sensors are configured to at obtaining sensor data pertaining to the vehicle and the trailer. The non-transitory computer readable storage medium is configured to store parameters that include dimensions pertaining to the vehicle, the trailer, or hitching of the trailer to the vehicle via a hitch. A processor is coupled to the sensors and to the non-transitory computer readable storage medium, and is configured to at least facilitate determining when instability of the trailer is likely to occur at a future time, using the sensor data and the parameters from the non-transitory computer readable storage medium; and taking vehicle actions, in accordance with instructions provided by the processor, when it is determined that the instability of the trailer is likely to occur at the future time.

20 Claims, 4 Drawing Sheets

(56) References Cited

U.S. PATENT DOCUMENTS

| | | | |
|---|---|---|---|
| 2017/0073004 A1* | 3/2017 | Shepard | B62D 15/028 |
| 2018/0037261 A1* | 2/2018 | Shepard | B60D 1/62 |
| 2018/0208241 A1* | 7/2018 | Shepard | B62D 13/06 |
| 2019/0276078 A1* | 9/2019 | Pourrezaei Khaligh | B62D 15/0295 |
| 2021/0188229 A1* | 6/2021 | Plaehn | B60T 7/20 |
| 2021/0316580 A1* | 10/2021 | Shepard | B60D 1/24 |
| 2022/0227418 A1* | 7/2022 | Vilca | G06N 20/00 |
| 2022/0274644 A1* | 9/2022 | Johansson | B60W 30/18036 |
| 2024/0042974 A1* | 2/2024 | Subramanian | B60T 8/323 |
| 2024/0116351 A1* | 4/2024 | Gurski | B60K 1/00 |
| 2024/0132054 A1* | 4/2024 | Weston | B60W 30/02 |

FOREIGN PATENT DOCUMENTS

| | | | | |
|---|---|---|---|---|
| DE | 102019209406 A1 | 12/2020 | | |
| DE | 102021121763 A1 | 2/2023 | | |
| DE | 102022117856 A1 | 1/2024 | | |
| EP | 2280263 A2 | 2/2011 | | |
| WO | WO-2011042966 A1 * | 4/2011 | | B60T 7/20 |
| WO | WO-2011070645 A1 * | 6/2011 | | B60T 7/20 |

\* cited by examiner

SYSTEM AND METHOD FOR TRAILER INSTABILITY ADVANCED WARNING BASED ON HITCH LOAD MEASUREMENT

TECHNICAL FIELD

The technical field generally relates to vehicles and, more specifically, to systems and methods for controlling towing of trailers using vehicles.

BACKGROUND

Certain vehicles today have systems that control towing of a trailer. However, existing techniques may not always provide advanced warning or action with respect to trailer instability.

Accordingly, it is desirable to provide improved methods and systems for controlling the towing of a trailer via a vehicle, including providing of advanced warning or action with respect to trailer instability. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method for controlling towing of a trailer by a vehicle, the method including obtaining, via one or more sensors of the vehicle, sensor data pertaining to the vehicle and the trailer; obtaining, from a non-transitory computer readable storage medium of the vehicle, one or more parameters that include one or more dimensions pertaining to the vehicle, the trailer, or hitching of the trailer to the vehicle via a hitch; determining, via one or more processors of the vehicle, when instability of the trailer is likely to occur at a future time, using the sensor data and the one or more parameters from the non-transitory computer readable storage medium; and taking one or more vehicle actions, in accordance with instructions provided by the one or more processors, when it is determined that the instability of the trailer is likely to occur at the future time.

Also in an exemplary embodiment, the step of taking the one or more vehicle actions includes providing one or more notifications to a user of the vehicle regarding the instability of the trailer that is likely to occur at the future time, in accordance with the instructions provided by the one or more processors.

Also in an exemplary embodiment, the step of taking the one or more vehicle actions includes automatically limiting a speed of the vehicle when it is determined that the instability of the trailer is likely to occur at the future time, in accordance with the instructions provided by the one or more processors.

Also in an exemplary embodiment, the sensor data includes one or more hitch forces as to the hitching of the trailer to the vehicle at the hitch.

Also in an exemplary embodiment, the sensor data includes a hitch vertical force and a hitch longitudinal force, in addition to a speed of the vehicle, an acceleration of the vehicle, a yaw rate of the vehicle, and a hitch articulation angle.

Also in an exemplary embodiment, the method further includes determining a current acceleration of the vehicle from the sensor data; and calculating a maximum allowable acceleration, via the one or more processors, based on the sensor data and the one or more dimensions; wherein the step of determining when the instability of the trailer is likely includes determining, via the one or more processors of the vehicle, that the instability of the trailer is likely to occur at the future time when the current acceleration is greater than the maximum allowable acceleration.

Also in an exemplary embodiment, the method further includes determining cornering coefficients for the vehicle and the trailer, using the sensor data and the one or more dimensions; determining axle loads for the vehicle and the trailer, using the sensor data and the one or more dimensions; and determining understeer coefficients for the vehicle and the trailer, using the cornering coefficients and the axle loads; wherein the step of determining when the instability of the trailer is likely includes determining, via the one or more processors of the vehicle, that the instability of the trailer is likely to occur at the future time using the understeer coefficients for the vehicle and the trailer.

Also in an exemplary embodiment, the method further includes determining a critical speed for the vehicle, using the understeer coefficients for the vehicle and the trailer; and determining a recommended speed for the vehicle, using the understeer coefficients for the vehicle and the trailer along with a calibrated safety factor; wherein the step of determining when the instability of the trailer is likely includes determining, via the one or more processors of the vehicle, that the instability of the trailer is likely to occur at the future time when a current speed of the vehicle exceeds the recommended speed.

Also in an exemplary embodiment, the method further includes automatically limiting the speed of the vehicle so as not to exceed the recommended speed, in accordance with the instructions provided by the one or more processors.

In another exemplary embodiment, a system is provided for controlling towing of a trailer by a vehicle, the system including one or more sensors of the vehicle, a non-transitory computer readable storage medium of the vehicle, and one or more processors of the vehicle. The one or more sensors are configured to at least facilitate obtaining sensor data pertaining to the vehicle and the trailer. The non-transitory computer readable storage medium is configured to store one or more parameters that include one or more dimensions pertaining to the vehicle, the trailer, or hitching of the trailer to the vehicle via a hitch. The one or more processors are coupled to the one or more sensors and to the non-transitory computer readable storage medium, and are configured to at least facilitate determining when instability of the trailer is likely to occur at a future time, using the sensor data and the one or more parameters from the non-transitory computer readable storage medium; and taking one or more vehicle actions, in accordance with instructions provided by the one or more processors, when it is determined that the instability of the trailer is likely to occur at the future time.

Also in an exemplary embodiment, the one or more processors are configured to at least facilitate providing the instructions for one or more notifications to a user of the vehicle regarding the instability of the trailer that is likely to occur at the future time.

Also in an exemplary embodiment, the one or more processors are configured to at least facilitate providing the instructions for automatically limiting a speed of the vehicle when it is determined that the instability of the trailer is likely to occur at the future time.

Also in an exemplary embodiment, the sensor data includes one or more hitch forces as to the hitching of the trailer to the vehicle at the hitch.

Also in an exemplary embodiment, the sensor data includes a hitch vertical force and a hitch longitudinal force, in addition to a speed of the vehicle, an acceleration of the vehicle, a yaw rate of the vehicle, and a hitch articulation angle.

Also in an exemplary embodiment, the one or more processors are further configured to at least facilitate determining a current acceleration of the vehicle from the sensor data; calculating a maximum allowable acceleration, based on the sensor data and the one or more dimensions; and determining that the instability of the trailer is likely to occur at the future time when the current acceleration is greater than the maximum allowable acceleration.

Also in an exemplary embodiment, the one or more processors are further configured to at least facilitate determining cornering coefficients for the vehicle and the trailer, using the sensor data and the one or more dimensions; determining axle loads for the vehicle and the trailer, using the sensor data and the one or more dimensions; determining understeer coefficients for the vehicle and the trailer, using the cornering coefficients and the axle loads; and determining that the instability of the trailer is likely to occur at the future time using the understeer coefficients for the vehicle and the trailer.

Also in an exemplary embodiment, the one or more processors are further configured to at least facilitate determining a critical speed for the vehicle, using the understeer coefficients for the vehicle and the trailer; determining a recommended speed for the vehicle, using the understeer coefficients for the vehicle and the trailer along with a calibrated safety factor; and determining that the instability of the trailer is likely to occur at the future time when a current speed of the vehicle exceeds the recommended speed.

Also in an exemplary embodiment, the one or more processors are further configured to at least facilitate automatically limiting the speed of the vehicle so as not to exceed the recommended speed, in accordance with the instructions provided by the one or more processors.

In another exemplary embodiment, a vehicle is provided that includes a body, a propulsion system, a hitch, one or more sensors, a non-transitory computer readable storage medium; and one or more processors. The propulsion system is configured to generate movement of the body. The hitch is configured for coupling to a trailer for towing the trailer. The one or more sensors configured to at least facilitate obtaining sensor data pertaining to the vehicle and the trailer. The non-transitory computer readable storage medium is configured to store one or more parameters that include one or more dimensions pertaining to the vehicle, the trailer, or hitching of the trailer to the vehicle via the hitch. The one or more processors are coupled to the one or more sensors and to the non-transitory computer readable storage medium, and are configured to at least facilitate determining when instability of the trailer is likely to occur at a future time, using the sensor data and the one or more parameters from the non-transitory computer readable storage medium; and taking one or more vehicle actions, in accordance with instructions provided by the one or more processors, when it is determined that the instability of the trailer is likely to occur at the future time.

Also in an exemplary embodiment, the one or more processors are configured to at least facilitate providing the instructions for automatically limiting a speed of the vehicle when it is determined that the instability of the trailer is likely to occur at the future time.

DESCRIPTION OF THE DRAWINGS

The present disclosure will hereinafter be described in conjunction with the following drawing figures, wherein like numerals denote like elements, and wherein:

FIG. 3A and FIG. 3B (collectively also referred to herein as FIG. 3) provide FIG. 3 is a flowchart of a process for controlling towing of a trailer via a vehicle, including providing advanced warning or action as to trailer instability, and that can be incorporated in connection with the system of FIG. 1, including the vehicle thereof and trailer thereof, and further including the control system of FIG. 2 and the flow of FIG. 1, in accordance with exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
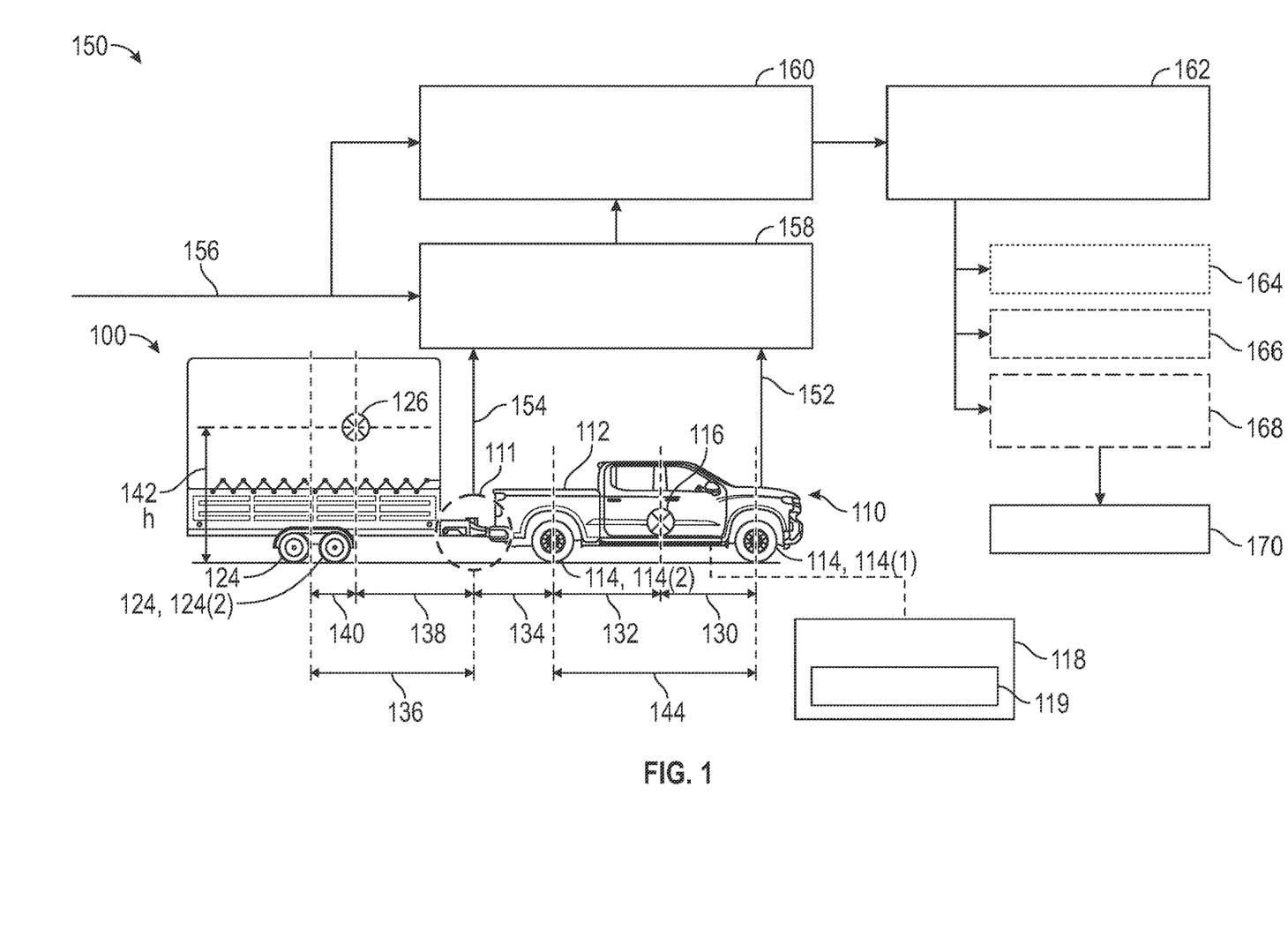
FIG. 1 is a functional diagram of a system that includes a vehicle and a trailer that is towed by the vehicle, with the functional diagram further illustrating a flow for the control of the towing of the trailer via the vehicle, in accordance with exemplary embodiments.

FIG. 1 is a functional diagram of a system 100 that includes a vehicle 110 and a trailer 120 that is towed by the vehicle 110, in accordance with exemplary embodiments. In addition, the function diagram of FIG. 1 also illustrates a flow 150 flow for the control of the towing of the trailer 120 via the vehicle 110 and the prevention or mitigation of future trailer instability, in accordance with exemplary embodiments:

In various embodiments, the vehicle 110 comprises an automobile. The vehicle 110 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 110 may also comprise a motorcycle or other vehicle, such as aircraft, spacecraft, watercraft, and so on, and/or one or more other types of mobile platforms (e.g., a robot and/or other mobile platform).

In certain embodiments, the vehicle 110 may comprise an autonomous or semi-autonomous vehicle, for example in which vehicle control (including acceleration, deceleration, braking, and/or steering) is automatically planned and executed by the control system 119.

In the depicted embodiment, the vehicle 110 includes a body 112 that is arranged on a chassis. The body 112 substantially encloses other components of the vehicle 110. The vehicle 110 also includes a plurality of wheels 114. The wheels 114 are each rotationally coupled to the chassis near a respective corner of the body 112 to facilitate movement of the vehicle 110. In one embodiment, the vehicle 110 includes four wheels 114, although this may vary in other embodiments (for example for trucks and certain other vehicles). In various embodiments, the wheels 114 include front wheels 114(1) and rear wheels 114(2).

As depicted in FIG. 1, in various embodiments the vehicle 110 includes a hitch 111 that is configured to be coupled to the trailer 120 for towing the trailer 120. In various embodiments, the hitch 111 comprises a load sensing hitch that helps to obtain sensor data used for control of the towing of the trailer 120, including the providing of advanced warning and/or other actions as to potential future instability of the trailer 120.

Figure 2:
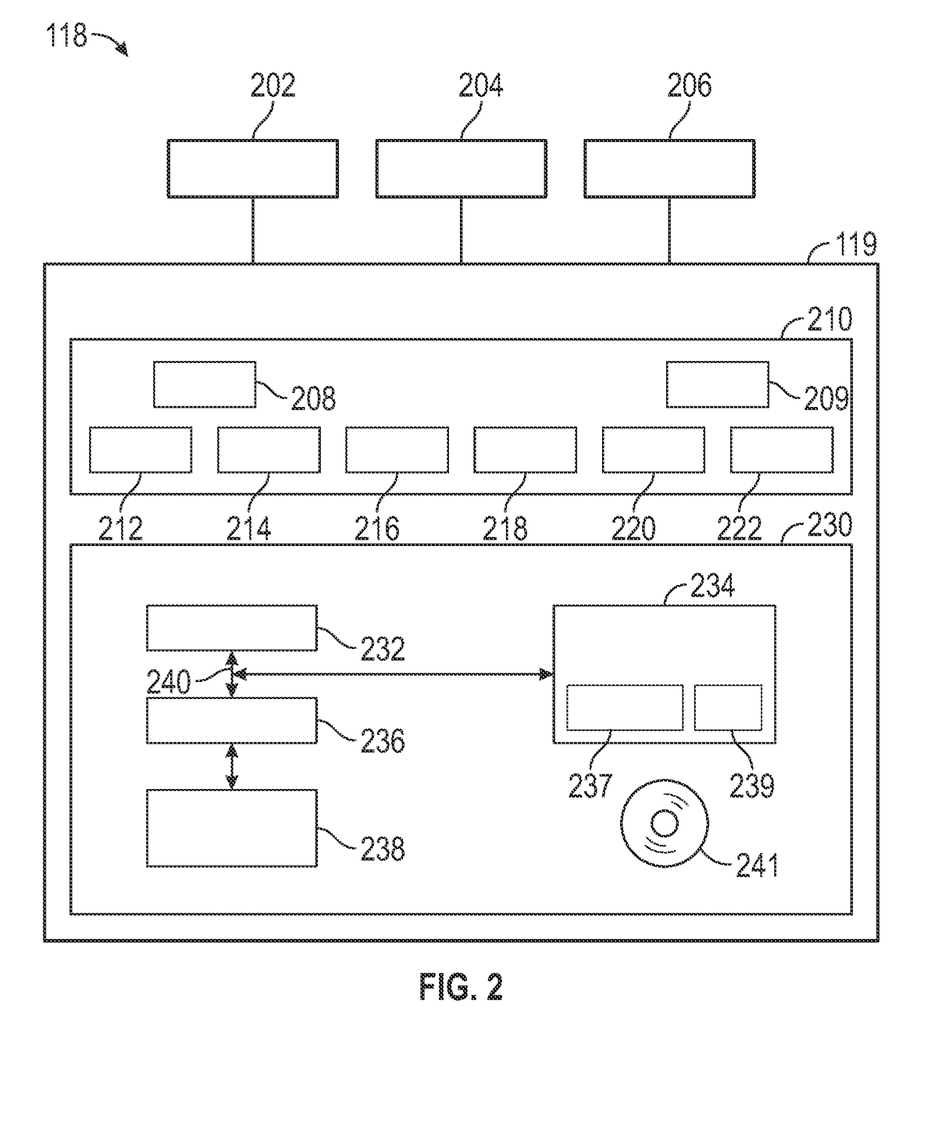
FIG. 2 is a functional block diagram of vehicle systems for the vehicle of the system of FIG. 1, including a braking system, a steering system, a propulsion system, and a control system for control thereof, in accordance with exemplary embodiments.

In various embodiments, the vehicle 110 also includes a number of systems 118, including a control system 119. As depicted in FIG. 2 and as described in greater detail further below in connection therewith, in various embodiments the control system 119 controls movement and other operation of the vehicle 110, including the towing of the trailer 120, using sensor data, including sensor data obtained proximate the hitch 111.

As depicted in FIG. 1, the vehicle 110 has a center of gravity 116. In various embodiments, the center of gravity 116 may be estimated by the control system 119, for example as described in greater detail further below in connection with the flow 150 of FIG. 1 and the process 300 of FIG. 3.

Also as depicted in FIG. 1, the trailer 120 also includes a body 122 and a plurality of wheels 124 for movement of the trailer 120. In various embodiments, the trailer 120 is configured to be coupled to the vehicle 110 via the hitch 111 for towing of the trailer 120 by the vehicle 110.

As depicted in FIG. 1, the trailer 120 has a center of gravity 126. In various embodiments, the center of gravity 126 may also be estimated by the control system 119, for example as described in greater detail further below in connection with the flow 150 of FIG. 1 and the process 300 of FIG. 3.

As illustrated in FIG. 1, in various embodiments towing of the trailer 120 via the vehicle 110 is controlled via the flow 150 depicted in FIG. 1 in a manner that mitigates or prevents future trailer instability (e.g., sway), based on sensor data and various known parameters of the vehicle 110 and the trailer 120. Specifically, in various embodiments, the flow 150 for towing control utilizes the following parameters (i.e., dimensions), among others: a distance "a" 130 (namely, a longitudinal distance) between the front wheels 114(1) of the vehicle 110 and the center of gravity 116 of the vehicle 110; a distance "b" 132 (namely, a longitudinal distance) between the center of gravity 116 of the vehicle 110 and the rear wheels 114(2) of the vehicle 110; a distance "c" 134 (namely, a longitudinal distance) between the rear wheels 114(2) of the vehicle 110 and the hitch 111; a distance (or trailer length) "D" 136 (namely, a longitudinal distance) between the hitch 111 and the wheels 124 of the trailer 120; a distance "e" 138 (namely, a longitudinal distance) between the hitch 111 and the center of gravity 126 of the trailer 120; a distance "f" 140 (namely, a longitudinal distance) between the center of gravity 126 of the trailer 120 and the wheels 124 of the trailer 120; a height "h" 142 (namely, a vertical distance) between the wheels 124 and the center of gravity 126 of the trailer 120, and a length "l" 144 between the front wheels 114(1) and the rear wheels 114(2) of the vehicle 110. In various embodiments, these are each known vehicle and/or trailer parameters (i.e., dimensions) that are stored in the control system 119, namely in a computer memory 234 thereof that is depicted in FIG. 2 and described further below in connection therewith.

In various embodiments, with reference to the flow 150 of FIG. 1, vehicle data is provided at 152. In various embodiments, the vehicle data includes values of dynamic vehicle parameters such as speed, acceleration, and yaw rate, for example as obtained via a sensor array 210 as described greater below in connection with FIG. 2.

Also in various embodiments with continued reference to the flow 150 of FIG. 1, hitch force data is provided at 154. In various embodiments, the hitch force data includes values of hitch forces, including in longitudinal, vertical, and lateral directions.

Also in various embodiments, various dimensions and parameters of the vehicle 110 and the trailer 120 are provided at 156. In various embodiments, the dimensions and parameters include known weights of the vehicle 110 and the trailer 120, along with the above-described dimensions and parameters that include the distance "a" 130, the distance "b" 132, the distance "c" 134, the distance "D" 136, the distance "e" 138, the distance "f" 140, and the height "h" 142 as described above.

In various embodiments, the vehicle data of 152, the hitch force data of 154, and the dimensions and parameters of 156 are each utilized in estimating the location of the center of gravity 126 of the trailer 120 along with estimating a cornering coefficient of the trailer 120 (e.g., of the wheels 124 thereof). In various embodiments, this is performed by the control system 119 of FIGS. 1 and 2, including the processor 232 thereof that is described further below in connection with FIG. 2.

Also in various embodiments, as part of the flow 150 of FIG. 1, rollover thresholds and understeer coefficients are calculated for the vehicle 110 and the trailer 120, along with a recommended safe towing speed, at 160. In various embodiments, these values are calculated, based on the dimensions and parameters of 156 and estimations of 158, by the control system 119 of FIGS. 1 and 2, including the processor 232 thereof that is described further below in connection with FIG. 2.

In addition, in various embodiments, also as part of the flow 150 of FIG. 1, advanced instability warnings and/or other actions are provided at 162 based on the calculations of 160. In various embodiments, warnings are provided for a driver of the vehicle 110 when any of the values of 160 exceed respective predetermined thresholds that are deemed to be indicative of instability of the trailer 120.

In certain embodiments, as part of 162, one or more messages are provided for the user (or driver) of the vehicle 110 as to one or more of the following: (a) a first message 164 that towing is recommended under present conditions; (b) a second message 166 that towing is not recommended under present conditions; or (c) a third message that 168 towing is recommended only if the speed of the vehicle 110 remains below a predetermined threshold level.

Also in certain embodiments, one or more additional actions are taken at 170. Specifically, in certain embodiments, a speed of the vehicle 110 may be automatically limited for towing, in accordance with instructions provided by the control system 119 of FIGS. 1 and 2 (e.g., via the processor 232 of FIG. 2).

FIG. 2 is a functional block diagram of vehicle systems 118 for the vehicle 110 of the system 100 of FIG. 1, in accordance with exemplary embodiments. As set forth in FIG. 2, in various embodiments, the vehicle systems 118 include, among other possible systems, a braking system 202, a steering system 204, a propulsion system 206, and a control system 119 for control thereof, in accordance with exemplary embodiments.

In various embodiments, the braking system 202 controls braking of the vehicle 110 using braking components that are controlled via inputs provided by a driver (e.g., via a braking pedal in certain embodiments) and/or automatically via the control system 119. Also in exemplary embodiments, the steering system 204 controls steering of the vehicle 110 via steering components (e.g., a steering column coupled to axles and/or the wheels 114 of FIG. 1) that are controlled via inputs provided by a driver (e.g., via a steering wheel in certain embodiments) and/or automatically via the control system 119. In addition, in various embodiments, the propulsion system 206 includes one or more engines and/or motors that provide for movement of the vehicle 110 that are controlled via inputs by a driver (e.g., via an accelerator pedal in certain embodiments) and/or automatically via the control system 119.

In various embodiments, as depicted in FIG. 2, the control system 119 is coupled to the braking system 202, the steering system 204, and the propulsion system 206.

Also as depicted in FIG. 2, in various embodiments, the control system 119 includes a sensor array 210, a display system 208, a transceiver 209, and a controller 230.

In various embodiments, the sensor array 210 includes various sensors that collect sensor data as to the vehicle 110, the vehicle 110, and/or the coupling therebetween via the hitch 111. In various embodiments, the sensor array 210 includes one or more force sensors 212, speed sensors 214, accelerometers 216, yaw sensors 218, angle sensors 220, and/or other sensors 222.

In certain embodiments, the force sensors 212 obtain sensor data as to hitch forces for the hitching of the trailer 120 to the vehicle 110, including longitudinal, vertical, and lateral hitch forces. Also in various embodiments, the speed sensors 214 measure a speed of the vehicle 110 (e.g., via wheel speed sensors and/or other speed sensors 214). Also in various embodiments, the accelerometers 216 measure acceleration values for the vehicle 110, and the yaw sensors 218 measure yaw rates or related values for the vehicle 110. In addition, in various embodiments, the angle sensors 220 measure a hitch articulation angle for the hitch 111. Also in various embodiments as depicted in FIG. 1, the sensor array 210 may also include one or more other sensors 222.

In various embodiments, the display system 208 provides one or more warnings and/or other notifications for a driver or other user of the vehicle 110. In certain embodiments, the display system 208 may include one or more audio components (e.g., via speakers) and/or visual components (e.g., via one or more display screens) for providing the warnings and/or other notifications, such as those pertaining to potential instability of the trailer 120, in accordance with instructions provided by the controller 230.

In various embodiments, the transceiver 209 is utilized to transmit messages to a driver or user of the vehicle 110. In certain embodiments, the transceiver 209 is used to transmit messages with warnings and/or other notifications to the driver or other user (e.g., to a smart phone, computer, and/or other electronic device of the user), such as one or more warnings and/or other notifications pertaining to potential instability of the trailer 120, in accordance with instructions provided by the controller 230.

In various embodiments, the controller 230 is coupled to the sensor array 210, the display system 208, and the transceiver 209, as well as to the braking system 202, the steering system 204, and the propulsion system 206. In various embodiments, the controller 230 controls the functionality of the control system 119, as well as of the braking system 202, the steering system 204, and the propulsion system 206.

Figure 3A:
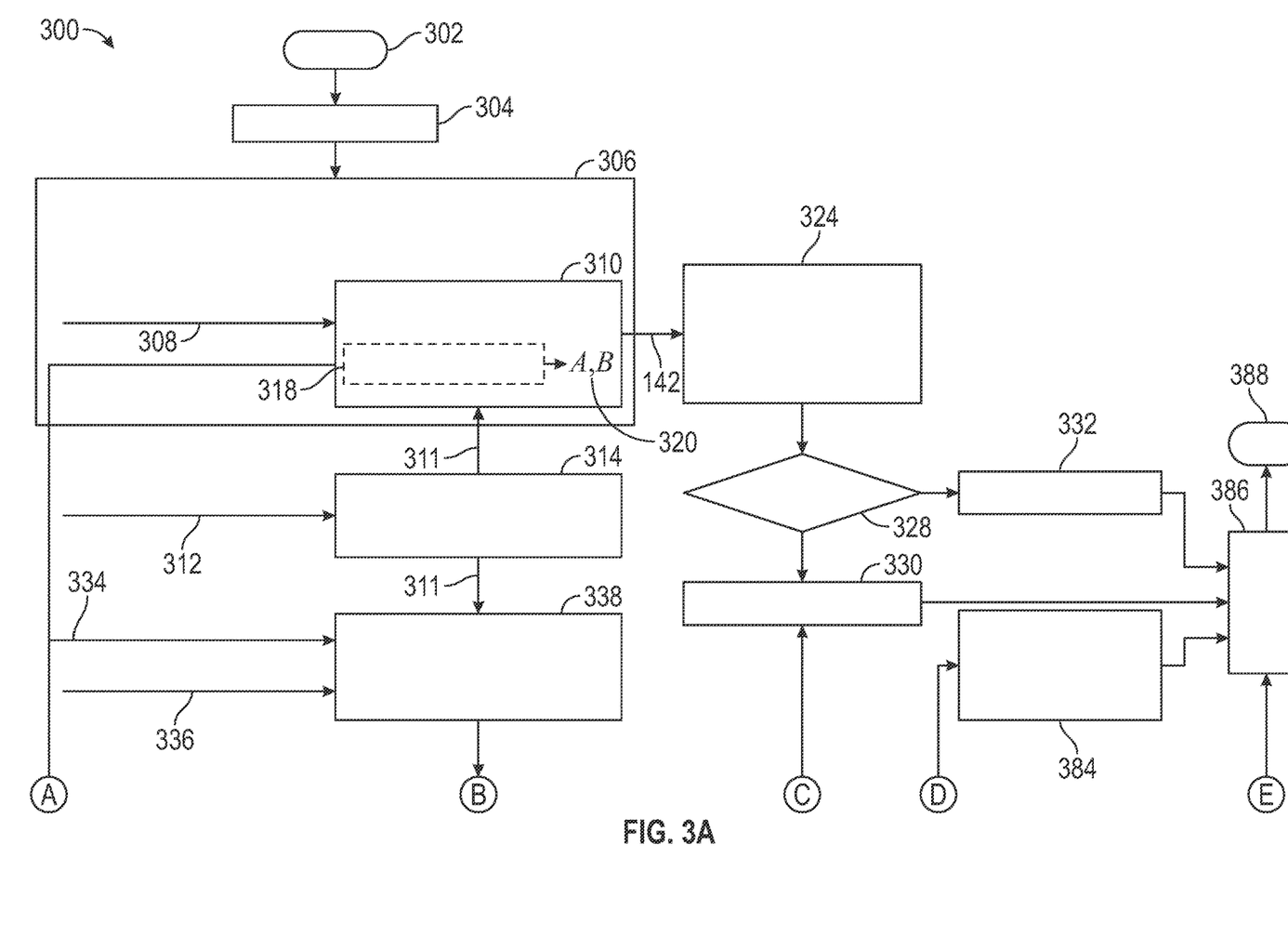
Figure 3B:
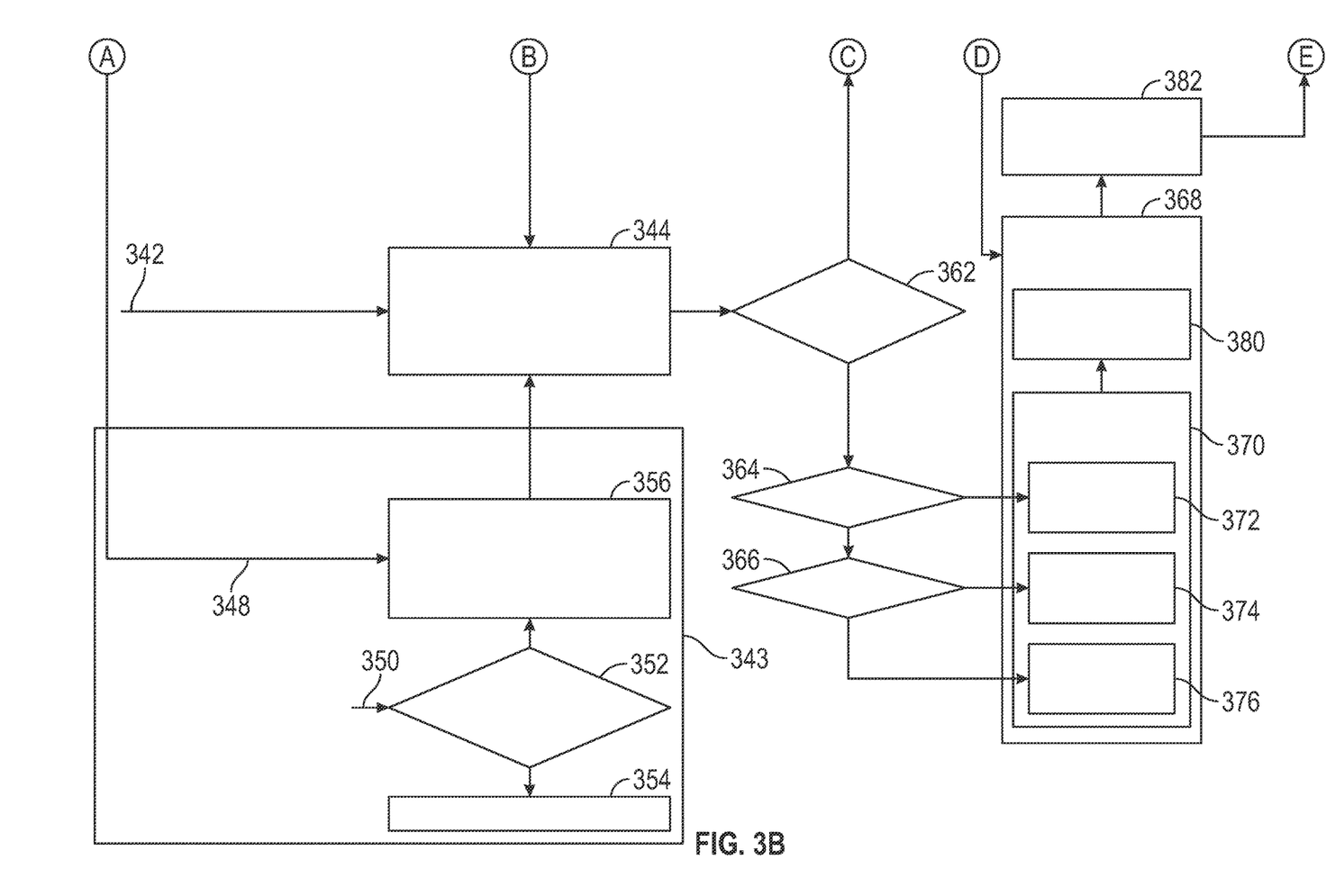

In various embodiments, the controller (or computer system) 230 controls towing of the trailer 120, including in providing warnings, mitigations, and/or other actions with respect to instability of the trailer 120 as it is being towed by the vehicle 110. In various embodiments, the controller 230 performs these steps in accordance with the steps of the flow 150 of FIG. 1 (described above) as well as the steps of the process 300 that is depicted in FIG. 3 and described further below in connection therewith.

In various embodiments, the controller 230 (and, in certain embodiments, the control system 119 itself) is disposed within the body 112 of the vehicle 110. In certain embodiments, the controller 230 and/or control system 119 and/or one or more components thereof may be disposed outside the body 112, for example on a remote server, in the cloud, or other device where image processing is performed remotely.

It will be appreciated that the controller 230 may otherwise differ from the embodiment depicted in FIG. 2. For example, the controller 230 may be coupled to or may otherwise utilize one or more remote computer systems and/or other control systems, for example as part of one or more of the above-identified vehicle 110 devices and systems.

As depicted in FIG. 2, in various embodiments, the controller 230 comprises a computer system, and includes a processor 232, a memory 234, an interface 236, a storage device 238, and a computer bus 240. The processor 232 performs the computation and control functions of the controller 230, and may comprise any type of processor or multiple processors, single integrated circuits such as a microprocessor, or any suitable number of integrated circuit devices and/or circuit boards working in cooperation to accomplish the functions of a processing unit. During operation, the processor 232 executes one or more programs 237 contained within the memory 234 and, as such, controls the general operation of the controller 230 in executing the processes described herein, such as the processes and implementations depicted in FIGS. 1 and 3 and as described in connection therewith.

The memory 234 can be any type of suitable memory. For example, the memory 234 may include various types of dynamic random access memory (DRAM) such as SDRAM, the various types of static RAM (SRAM), and the various types of non-volatile memory (PROM, EPROM, and flash). In certain examples, the memory 234 is located on and/or co-located on the same computer chip as the processor 232. In the depicted embodiment, the memory 234 stores the above-referenced program 237 along with one or more stored values 239 (such as known dimensions and parameters of the vehicle 110 and the trailer 120 along with threshold values pertaining to vehicle speed and/or other parameters in controlling towing of the trailer 120).

The bus 240 serves to transmit programs, data, status and other information or signals between the various components of the computer system of the controller 230. The interface 236 allows communication to the computer system of the controller 230, for example from a system driver and/or another computer system, and can be implemented using any suitable method and apparatus. In one embodiment, the interface 236 obtains the various data from the sensor array 210 and/or the stored values 239 from the memory 234. The interface 236 may also include one or more network interfaces to communicate with technicians, and/or one or more storage interfaces to connect to storage apparatuses, such as the storage device 238.

The storage device 238 can be any suitable type of storage apparatus, including various different types of direct access storage and/or other memory devices. In one exemplary embodiment, the storage device 238 comprises a program product from which memory 234 can receive a program 237 that executes one or more embodiments of the processes and implementations of FIGS. 1 and 3 and as described in connection therewith. In another exemplary embodiment, the program product may be directly stored in and/or otherwise accessed by the memory 234 and/or a secondary storage device (e.g., disk 241), such as that referenced below.

The bus 240 can be any suitable physical or logical means of connecting computer systems and components. This includes, but is not limited to, direct hard-wired connections, fiber optics, infrared and wireless bus technologies. During operation, the program 237 is stored in the memory 234 and executed by the processor 232.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 232) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 230 may also otherwise differ from the embodiment depicted in FIG. 2, for example in that the computer system of the controller 230 may be coupled to or may otherwise utilize one or more remote computer systems and/or other control systems.

With reference to FIG. 3, a flowchart is provided of a process 300 for controlling towing of a trailer via a vehicle, including providing advanced warning or action as to trailer instability, in accordance with exemplary embodiments. In various embodiments, the process 300 can be incorporated in connection with the system 100 of FIG. 1, including the vehicle 110 thereof and trailer 120 thereof, and further including the control system 119 of FIGS. 1 and 2. Also in various embodiments, the process 300 corresponds to the flow 150 of FIG. 1 (e.g., as a more detailed implementation thereof).

As depicted in FIG. 3, the process 300 begins at step 302 when the vehicle 110 of FIG. 1 is started when the vehicle 110 begins operation at a time in which the trailer 120 is hitched to the vehicle 110 and the vehicle 110 is towing the trailer 120. In various embodiments, the process 300 continues until the vehicle 110 has stopped operation and/or has stopped towing the trailer 120 (e.g., upon completion of a current vehicle drive or ignition cycle), successfully exited the parking spot into a lane of the roadway.

In various embodiments, sensor data is obtained (step 304). In various embodiments, sensor data is obtained from the various sensors of the sensor array 210 of FIG. 1. In various embodiments, sensor data is obtained via the various sensors of the sensor array 210 of FIG. 2. Also in various embodiments, the sensor data includes the sensor data obtained in step 152 of the flow 150 of FIG. 1. In addition, in various embodiments, various known dimensions and parameters of the vehicle 110 and the trailer 120 are also obtained via the memory 234 (e.g., as stored values 239 therefrom), including the dimensions and parameters of step 156 of the flow 150 of FIG. 1.

In various embodiments, the center of gravity of the trailer is estimated in subroutine 306. Specifically, in various embodiments, various sensor data values (including hitch vertical force $F_t$, vehicle acceleration $a_x$, and trailer distance (or length) "D" 136 of FIG. 1) are obtained at step 308 and provided to a trailer center of gravity location estimator 310. Also in various embodiments, the trailer center of gravity location estimator 310 also utilizes a trailer weight ($W_t$) 311 that is estimated as described below.

Specifically, in various embodiments, in order to estimate the trailer weight ($W_t$) 311, additional sensor data values (including hitch longitudinal force, vehicle speed, and vehicle acceleration) are provided at step 312. In various embodiments, these additional sensor data values are provided into a trailer weight estimator 314 that uses these values to determine the trailer weight ($W_t$) 311.

With reference back to the trailer center of gravity estimator 310, in various embodiments an estimation engine 318 is utilized in calculating the trailer's center of gravity in connection with the following Equations:

$$F_t = A + Bax, \quad \text{(Equation 1)}$$

$$f = AD/Wt, \quad \text{(Equation 2)}$$

$$e = D - f, \text{ and} \quad \text{(Equation 3)}$$

$$h - g(BD/wt), \quad \text{(Equation 4)}$$

in which "$F_t$" represents the hitch vertical force, "$a_x$" represents the vehicle acceleration, "D" represents known distance "D" 136 of FIG. 1, "A" and "B" represent results 320 of Equation 1, "$W_t$" represents the trailer weight 311, "e" represents distance "e" 138 of FIG. 1, "f" represents distance "f" 140 of FIG. 1, "g" represents the known gravitational coefficient (e.g., 9.8 m/s²), and "h" represents the height "h" 142 of FIG. 1 for the center of gravity 126 of the trailer 120 of FIG. 1 and as solved above.

In various embodiments, the value of the height "h" 142 (as solved above) is utilized in calculating a trailer rollover threshold at step 324. Specifically, in various embodiments, during step 324, the trailer rollover threshold corresponds to a maximum lateral acceleration ($a_{safe}$), such that towing is recommended only when the lateral acceleration is less than this threshold. In various embodiments, during step 324, $a_{safe}$ is calculated in accordance with the following equation:

$$a_{safe} = (T_t/2h) * g, \quad \text{(Equation 5)}$$

in which $T_t$ represents the track width of the trailer.

In various embodiments, a determination is then made at step 328 as to whether the maximum lateral acceleration ($a_{safe}$) is greater than a current lateral acceleration ($a_c$) for the trailer 120. In various embodiments, this determination (along with the various other determinations of the process 300) is made by the processor 232 of FIG. 2.

In various embodiments, if it is determined at step 328 that the maximum lateral acceleration ($a_{safe}$) is greater than a current lateral acceleration ($a_c$), then it is determined in step 330 that towing of the trailer 120 is acceptable (or recommended). In certain embodiments, one or more corresponding actions are provided in a version of step 386, such as by providing a notification that towing acceptable (or recommended), and by physically allowing such towing without any limitations as to vehicle speed, and so on. In certain embodiments, the process 300 may then terminate at step 388.

Conversely, in various embodiments, if it is instead determined at step 328 that the maximum lateral acceleration ($a_{safe}$) is less than or equal to the current lateral acceleration ($a_c$), then it is instead determined that towing of the trailer 120 is not acceptable (or not recommended). In certain embodiments, one or more corresponding actions are provided in a version of step 386, such as by providing a notification that towing is not acceptable (or not recommended), and/or by placing some physical restriction on towing (e.g., as to vehicle speed). In certain embodiments, the process 300 may then terminate at step 388.

With reference back to the trailer weight estimator 314, the estimated trailer weight $W_t$ 311 is also provided for additional calculations as to trailer axle load and vehicle axle load in step 338. In various embodiments, in order for the calculations of step 338 to be made, the trailer center of gravity location "e" is provided at step 334, and various known vehicle parameters (including a known vehicle weight $W_0$, along with known distances "a" 130, "b" 132, "c" 134, and "l" 144 of FIG. 1) are provided at step 336. Specifically, in various embodiments, the estimated trailer weight $W_t$ 311 is utilized along with the various values of steps 334 and 336 to calculate the trailer axle load $W_{tr}$, the vehicle front axle load $W_f$, and the vehicle rear axle load $W_r$ in step 338 accordance with the following equations:

$$W_{tr} = (e/D) * W_t, \quad \text{(Equation 6)}$$

$$W_r = (a/l) * W_0 + (f/D) * W_t^*(1 + c/l), \text{ and} \quad \text{(Equation 7)}$$

$$W_f = (b/l) * W_0 - (f/D) * W_t^*(c/l). \quad \text{(Equation 8)}$$

In various embodiments, the trailer axle load $W_{tr}$, the vehicle front axle load $W_f$, and the vehicle rear axle load $W_r$ are each then utilized in step 344 to calculate a trailer understeer coefficient $K_{ust}$ and a vehicle understeer coefficient $K_{usv}$. Specifically, in order for these calculations to be made, known axle cornering coefficients are provided at step 342 (e.g., from the memory 234 of FIG. 2 as stored values 239 therefrom), including a known vehicle front axle cornering coefficient "$c_{af}$" and a known vehicle rear axle cornering coefficient "$c_{ar}$").

In addition, also before the trailer understeer coefficient $K_{ust}$ and vehicle understeer coefficient $K_{usv}$ are calculated, a subroutine 343 is performed to estimate one or more trailer axle cornering coefficients $c_{at}$. Specifically, in various embodiments, during subroutine 343, the center of gravity location for the trailer is provided at step 348, along with distances "e" 138 and "f" 140 of FIG. 1. In addition, also as part of subroutine 343, in various parameters various additional parameters are also provided at step 350 that include hitch lateral force ($F_{yt}$), vehicle speed (v), vehicle yaw rate (r), and hitch articulation angle (θ), along with distances "e" 138 and "f" 140 of FIG. 1.

Also in various embodiments as part of the subroutine 343, a determination is made as to whether the trailer is experiencing steady state cornering (step 356). In various embodiments, the trailer is determined to be experiencing steady state cornering if an absolute value of the rate of change of the vehicle yaw rate (r) and an absolute value of the rate of change of the hitch articulation angle (θ) are both less than or equal to zero. In various embodiments, when it is determined at step 352 that the trailer is not experiencing steady state cornering, the process waits at step 354 until steady state cornering is present. Conversely, also in various embodiments, once it is determined in an iteration of step 352 that the trailer is experiencing steady state cornering, then the process proceeds to step 356, described directly below.

In various embodiments, during step 356 of subroutine 343, the one or more trailer cornering coefficients ($c_{at}$) are estimated using the various above-described parameters and values of steps 348 and 350, in accordance with the following equation:

$$C_{at} = (e/f) * [(v\cos\theta)/(v\sin\theta + (e+f)*r)] * F_{yt}. \quad \text{(Equation 9)}$$

With reference back to step 344, in various embodiments, the trailer cornering coefficient "$c_{at}$" of subroutine 346 is then utilized in combination with the trailer axle load $W_{tr}$, the vehicle front axle load $W_f$, and the vehicle rear axle load $W_r$ of step 338, along with the vehicle front axle cornering coefficient "$c_{af}$" and the vehicle rear axle cornering coefficient "$c_{ar}$" of step 342, to calculate the trailer understeer coefficient $K_{ust}$ and the vehicle understeer coefficient $K_{usv}$ in step 344 in accordance with the following equations:

$$K_{ust} = (W_r/C_{ar}) - (W_{tr}/C_{at}); \text{ and} \quad \text{(Equation 10)}$$

$$K_{usv} = (W_f/C_{af}) - (W_r/C_{ar}). \quad \text{(Equation 11)}$$

In various embodiments, the calculated values $K_{ust}$ and $K_{usv}$ of step 344 are then utilized in determinations of step 362, 364, and 366 as to a stability of the trailer based on these values.

First with reference to step 362, in various embodiments determinations are made as to whether the trailer understeer coefficient $K_{ust}$ and the vehicle understeer coefficient $K_{usv}$ are both greater than or equal to zero. In various embodiments, if both of these conditions are satisfied, then the process proceeds to the above-described step 330, in which it is determined that towing of the trailer 120 is acceptable (or recommended). In certain embodiments, one or more corresponding actions are provided in a version of step 386, such as by providing a notification that towing acceptable (or recommended), and by physically allowing such towing without any limitations as to vehicle speed, and so on. In certain embodiments, the process 300 may then terminate at step 388.

Conversely, in various embodiments, if it is instead determined the one or both of the conditions of step 362 are not satisfied, then a determination is made in step 364 as to whether the vehicle understeer coefficient $K_{usv}$ is greater than or equal to zero. If it is determined that the vehicle understeer coefficient $K_{usv}$ is greater than or equal to zero, then the process proceeds to step 372. Specifically, during step 372, a critical speed for the vehicle is calculated in accordance with a first critical speed equation, namely:

$$V_c = \sqrt{\left(\frac{gD}{-Kust}\right)}. \quad \text{(Equation 12)}$$

Conversely, in various embodiments, if it is instead determined in step 364 that the vehicle understeer coefficient $K_{usv}$ is less than zero, then a determination is made in step 366 as to whether the trailer understeer coefficient $K_{ust}$ is greater than or equal to zero. If it is determined that the trailer understeer coefficient $K_{ust}$ is greater than or equal to zero, then the process proceeds to step 374. Specifically, during step 374, the critical speed for the vehicle is instead calculated in accordance with a second critical speed equation, namely:

$$V_c = \sqrt{\left(\frac{gl}{-Kusv}\right)}. \quad \text{(Equation 13)}$$

Conversely, in various embodiments, if it is instead determined in step 366 that the trailer understeer coefficient $K_{ust}$ is less than zero, then the process instead proceeds to step 376, in which the critical speed for the vehicle is instead calculated in accordance with a third critical speed equation, namely:

$$V_c = \text{Min}\left[\sqrt{\frac{gl}{-Kusv}}, \sqrt{\left(\frac{gD}{-Kust}\right)}\right]. \quad \text{(Equation 14)}$$

As described above, in various embodiments the critical speed $V_c$ is calculated in one of steps 372, 374, or 376 (using a respective one of Equations 12, 13, or 14 above) depending upon the conditions of steps 362, 364, and 366. Also in various embodiments, the calculating of steps 372, 374, and 376 may collectively be referred to as a critical speed calculation corresponding to combined step 370 as depicted in FIG. 3. In various embodiments, the critical speed refers to a maximum vehicle speed, above which trailer instability (e.g., such as trailer sway) is likely to occur. In addition, also as depicted in FIG. 3, in various embodiments the critical speed calculation of combined step 370 is part of a speed estimation subroutine 368 that also includes a safe speed calculation (step 380).

Specifically, in various embodiments, a recommended (or safe) speed for the vehicle (V safe) corresponds to a recommended speed which should not be exceeded by the vehicle 110 while towing the trailer 120 under current conditions. In various embodiments, the recommended (or safe) speed for the vehicle ($V_{safe}$) is calculated in step 380 using the critical speed ($V_c$) calculated below in combined step 370 (i.e., in one of steps 372, 374, or 376) in accordance with the following equation:

$$V_{safe} = V_c/S_f, \quad \text{(Equation 15)}$$

in which $S_f$ represents a configurable safety factor with a value that is greater than one.

In various embodiments, the recommended (or safe) vehicle speed of step 380 is implemented in steps 382, 384, and/or 386 of FIG. 3.

Specifically, in various embodiments, the vehicle speed may be limited in step 382 so as to not to exceed the $V_{safe}$ value while the vehicle 110 is towing the trailer 120 under current conditions. In certain embodiments, during step 382, the processor 232 of FIG. 2 executes automated control of the braking system 202 and/or propulsion system 206 in order to maintain that the vehicle speed is less than the $V_{safe}$ value.

In addition, in various embodiments, one or more warnings or notifications may be provided in step 384 as to the $V_{safe}$ value. In certain embodiments, the processor 232 of FIG. 2 provides instructions for the providing of one or more messages to a driver or other user of the vehicle 110 that it is recommended that the vehicle speed be maintained below the $V_{safe}$ value while the vehicle 110 is towing the trailer 120 under current conditions. In certain embodiments, such messages and/or other warnings and/or notifications may be provided via the display system 208 of FIG. 2 (e.g., an audio and/or visual warning) and/or via the transceiver 209 of FIG. 2 (e.g., to a mobile phone or other electronic device of the user) in accordance with instructions provided by the processor 232.

In addition, one or more other actions may be taken at step 386. For example, in certain embodiments, one or more warnings and/or notifications may be provided to one or more other individuals or users (e.g., to a manager of a fleet of vehicles to which the vehicle 110 belongs, or the like). By way of additional example, the processor 232 may also implement one or more other control actions in certain embodiments (e.g., restricting further movement of the vehicle 110 with the trailer 120 hitched thereto, or the like).

In various embodiments, the process may then terminate at step 388.

Accordingly, methods, systems, and vehicles are provided herein that provide for potentially improved control of towing of a trailer by a vehicle. In various embodiments, various sensor data and other parameter values are utilized to predict potential trailer instability (e.g., sway or other instability) ahead of time, and to provide a warning in advance to a driver or other user. Also in various embodiments, vehicle speed is limited in order to help mitigate or prevent the trailer instability.

It will be appreciated that the systems, vehicles, and methods may vary from those depicted in the Figures and described herein. For example, the system 100 of FIG. 1, including the vehicle 110 and trailer 120 thereof and the control system 119 of FIGS. 1 and 2, and components thereof, may differ from those depicted in FIGS. 1 and 2. It will similarly be appreciated that the steps of the processes and implementations of FIGS. 1 and 3 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling towing of a trailer by a vehicle, the method comprising:
    obtaining, via one or more sensors of the vehicle, sensor data pertaining to the vehicle and the trailer, the sensor data including hitch forces as to the hitching of the trailer to the vehicle at the hitch, including a hitch vertical force and a hitch longitudinal force, in addition to a speed of the vehicle, an acceleration of the vehicle, a yaw rate of the vehicle, and a hitch articulation angle;
    obtaining, from a non-transitory computer readable storage medium of the vehicle, one or more parameters that include one or more dimensions pertaining to the vehicle, the trailer, or hitching of the trailer to the vehicle via a hitch;
    determining a current acceleration of the vehicle from the sensor data;
    calculating a maximum allowable acceleration, via one or more processors of the vehicle, based on the sensor data and the one or more dimensions;
    determining, via the one or more processors of the vehicle, when instability of the trailer is likely to occur at a future time, using the sensor data and the one or more parameters from the non-transitory computer readable storage medium, wherein the instability of the trailer is determined by the one or more processor of the vehicle to be likely to occur at the future time when the current acceleration is greater than the maximum allowable acceleration; and
    taking one or more vehicle actions, in accordance with instructions provided by the one or more processors, when it is determined that the instability of the trailer is likely to occur at the future time.

2. The method of claim 1, wherein the step of taking the one or more vehicle actions comprises providing one or more notifications to a user of the vehicle regarding the instability of the trailer that is likely to occur at the future time, in accordance with the instructions provided by the one or more processors.

3. The method of claim 1, wherein the step of taking the one or more vehicle actions comprises automatically limiting a speed of the vehicle when it is determined that the instability of the trailer is likely to occur at the future time, in accordance with the instructions provided by the one or more processors.

4. The method of claim 1, further comprising:
    determining cornering coefficients for the vehicle and the trailer, using the sensor data and the one or more dimensions;
    determining axle loads for the vehicle and the trailer, using the sensor data and the one or more dimensions; and
    determining understeer coefficients for the vehicle and the trailer, using the cornering coefficients and the axle loads;
    wherein the step of determining when the instability of the trailer is likely further comprises determining, via the one or more processors of the vehicle, that the instability of the trailer is likely to occur at the future time using the understeer coefficients for the vehicle and the trailer.

5. The method of claim 4, further comprising:
    determining a critical speed for the vehicle, using the understeer coefficients for the vehicle and the trailer; and
    determining a recommended speed for the vehicle, using the understeer coefficients for the vehicle and the trailer along with a calibrated safety factor;
    wherein the step of determining when the instability of the trailer is likely further comprises determining, via the one or more processors of the vehicle, that the instability of the trailer is likely to occur at the future time when a current speed of the vehicle exceeds the recommended speed.

6. The method of claim 5, further comprising:
    automatically limiting the speed of the vehicle so as not to exceed the recommended speed, in accordance with the instructions provided by the one or more processors.

7. A system for controlling towing of a trailer by a vehicle, the system comprising:
    one or more sensors of the vehicle configured to at least facilitate obtaining sensor data pertaining to the vehicle and the trailer, the sensor data including hitch forces as to the hitching of the trailer to the vehicle at the hitch, including a hitch vertical force and a hitch longitudinal force, in addition to a speed of the vehicle, an acceleration of the vehicle, a yaw rate of the vehicle, and a hitch articulation angle;
    a non-transitory computer readable storage medium of the vehicle that is configured to store one or more parameters that include one or more dimensions pertaining to the vehicle, the trailer, or hitching of the trailer to the vehicle via a hitch; and
    one or more processors of the vehicle that are coupled to the one or more sensors and to the non-transitory computer readable storage medium, and that are configured to at least facilitate:
        determining a current acceleration of the vehicle from the sensor data;
        calculating a maximum allowable acceleration, via one or more processors of the vehicle, based on the sensor data and the one or more dimensions;
        determining when instability of the trailer is likely to occur at a future time, using the sensor data and the one or more parameters from the non-transitory computer readable storage medium, wherein the one or more processors are configured to determine that the instability of the trailer is likely to occur at the future time when the current acceleration is greater than the maximum allowable acceleration; and
        taking one or more vehicle actions, in accordance with instructions provided by the one or more processors, when it is determined that the instability of the trailer is likely to occur at the future time.

8. The system of claim 7, wherein the one or more processors are configured to at least facilitate providing the instructions for one or more notifications to a user of the vehicle regarding the instability of the trailer that is likely to occur at the future time.

9. The system of claim 7, wherein the one or more processors are configured to at least facilitate providing the instructions for automatically limiting a speed of the vehicle when it is determined that the instability of the trailer is likely to occur at the future time.

10. The system of claim 7, wherein the one or more processors are further configured to at least facilitate:
- determining cornering coefficients for the vehicle and the trailer, using the sensor data and the one or more dimensions;
- determining axle loads for the vehicle and the trailer, using the sensor data and the one or more dimensions;
- determining understeer coefficients for the vehicle and the trailer, using the cornering coefficients and the axle loads; and
- determining that the instability of the trailer is likely to occur at the future time using the understeer coefficients for the vehicle and the trailer.

11. The system of claim 10, wherein the one or more processors are further configured to at least facilitate:
- determining a critical speed for the vehicle, using the understeer coefficients for the vehicle and the trailer;
- determining a recommended speed for the vehicle, using the understeer coefficients for the vehicle and the trailer along with a calibrated safety factor; and
- determining that the instability of the trailer is likely to occur at the future time when a current speed of the vehicle exceeds the recommended speed.

12. The system of claim 11, wherein the one or more processors are further configured to at least facilitate automatically limiting the speed of the vehicle so as not to exceed the recommended speed, in accordance with the instructions provided by the one or more processors.

13. A vehicle comprising:
- a body;
- a propulsion system configured to generate movement of the body;
- a hitch for coupling to a trailer for towing the trailer;
- one or more sensors configured to at least facilitate obtaining sensor data pertaining to the vehicle and the trailer, the sensor data including hitch forces as to the hitching of the trailer to the vehicle at the hitch, including a hitch vertical force and a hitch longitudinal force, in addition to a speed of the vehicle, an acceleration of the vehicle, a yaw rate of the vehicle, and a hitch articulation angle;
- a non-transitory computer readable storage medium that is configured to store one or more parameters that include one or more dimensions pertaining to the vehicle, the trailer, or hitching of the trailer to the vehicle via the hitch; and
- one or more processors that are coupled to the one or more sensors and to the non-transitory computer readable storage medium, and that are configured to at least facilitate:
  - determining a current acceleration of the vehicle from the sensor data;
  - calculating a maximum allowable acceleration, via one or more processors of the vehicle, based on the sensor data and the one or more dimensions;
  - determining when instability of the trailer is likely to occur at a future time, using the sensor data and the one or more parameters from the non-transitory computer readable storage medium, wherein the one or more processors are configured to determine that the instability of the trailer is likely to occur at the future time when the current acceleration is greater than the maximum allowable acceleration; and
  - taking one or more vehicle actions, in accordance with instructions provided by the one or more processors, when it is determined that the instability of the trailer is likely to occur at the future time.

14. The vehicle of claim 13, wherein the one or more processors are configured to at least facilitate providing the instructions for automatically limiting a speed of the vehicle when it is determined that the instability of the trailer is likely to occur at the future time.

15. The vehicle of claim 13, wherein the one or more processors are configured to at least facilitate providing the instructions for one or more notifications to a user of the vehicle regarding the instability of the trailer that is likely to occur at the future time.

16. The vehicle of claim 13, wherein the one or more processors are further configured to at least facilitate:
- determining cornering coefficients for the vehicle and the trailer, using the sensor data and the one or more dimensions;
- determining axle loads for the vehicle and the trailer, using the sensor data and the one or more dimensions;
- determining understeer coefficients for the vehicle and the trailer, using the cornering coefficients and the axle loads; and
- determining that the instability of the trailer is likely to occur at the future time using the understeer coefficients for the vehicle and the trailer.

17. The vehicle of claim 16, wherein the one or more processors are further configured to at least facilitate:
- determining a critical speed for the vehicle, using the understeer coefficients for the vehicle and the trailer;
- determining a recommended speed for the vehicle, using the understeer coefficients for the vehicle and the trailer along with a calibrated safety factor; and
- determining that the instability of the trailer is likely to occur at the future time when a current speed of the vehicle exceeds the recommended speed.

18. The vehicle of claim 17, wherein the one or more processors are further configured to at least facilitate automatically limiting the speed of the vehicle so as not to exceed the recommended speed, in accordance with the instructions provided by the one or more processors.

19. The vehicle of claim 18, wherein the one or more processors are further configured to at least facilitate calculating the recommended speed based on the critical speed.

20. The vehicle of claim 13, wherein the vehicle comprises an automobile.

* * * * *